3,732,349
PROCESS FOR SIMULTANEOUSLY SHEARING
AND QUENCHING POLYMER FILMS
Ho-Sou Chen, Summit, Ti Kang Kwei, Millington, and Tsuey Tang Wang, Stirling, N.J., assignors to Bell Telephone Laboratories, Incorporated, Murray Hill and Berkeley Heights, N.J.
Filed Jan. 7, 1971, Ser. No. 104,708
Int. Cl. B29c 15/00; B29d 7/14
U.S. Cl. 264—175                                           4 Claims

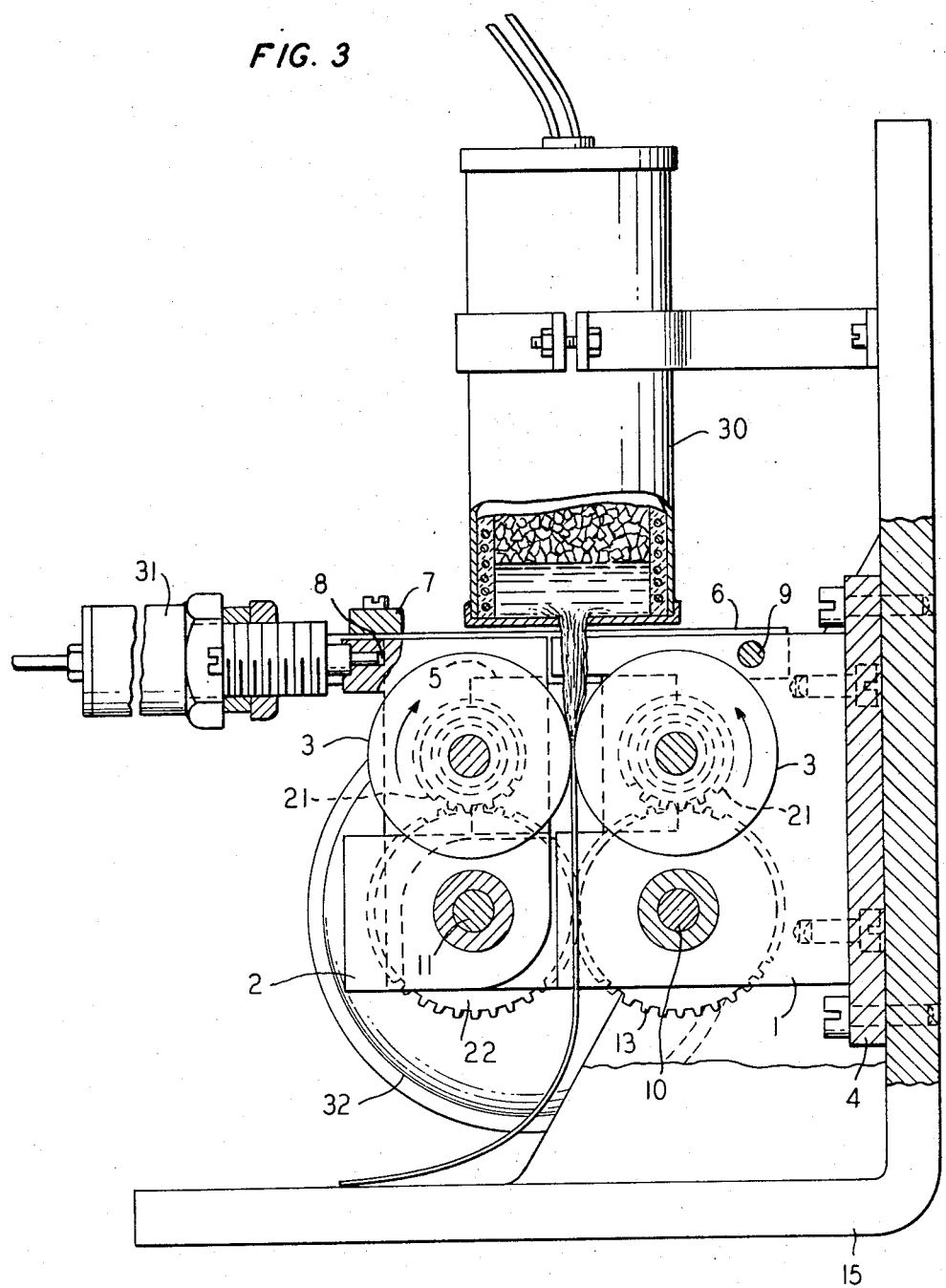

ABSTRACT OF THE DISCLOSURE

A process is described for producing polymer films with improved mechanical properties using substantially crystalline polymers. This is achieved by exposing molten polymer simultaneously to high shearing and quenching rates by contacting the molten polymer with a dry metallic surface which presses against the molten polymer. This process also increases the transparency of the polymer film.

BACKGROUND OF THE INVENTION

(1) Field of the invention

The invention relates to a process for producing polymer films with good mechanical properties.

(2) Description of the prior art

Crystalline polymer films have been produced in a variety of ways depending on economic considerations and the mechanical properties required for particular applications. In prevalent use is the so-called compression molding process for producing polymer films. Although this process has many economic advantages, it leaves much to be desired where the mechanical properties of the polymer film are of primary concern.

Attempts to produce crystalline polymer films with improved mechanical properties have only met with limited success. Two types of processes have been developed in an attempt to improve the mechanical properties of crystalline polymer films. Both are called processes for producing extruded film and are described by H. Keller and M. J. Machin in J. Macromol. Sci. (Phys.), B1(1), 41–91 (1967). One process involves extruding the polymer on heated rollers and subsequently cooling the polymer film. The other process involves simultaneous blowing and pulling molten polymer into a thin-walled cylindrical tube. In this blowing process solidification occurs during the expansion and flow of the film. This process requires extensive equipment for mass production. Although the polymer film produced by either of these processes exhibits some limited improvement in mechanical properties over the polymer film produced by the compression molding process, these mechanical properties are not sufficiently good for many applications.

In some applications transparency of the polymer film is desirable. For some polymers the blowing process described above does improve transparency somewhat. However, for other polymers such as high-density polyethylene, the blowing process does not lead to a transparent film.

SUMMARY OF THE INVENTION

The invention is a process for producing polymer film with improved mechanical properties in which molten polymer is simultaneously sheared and quenched very rapidly. In the inventive process shear is applied to the polymer in its molten state and while the shearing is taking place the polymer is rapidly cooled to below its melting point. This is done by confining the molten polymer between metallic surfaces such as between metal rollers which are being pressed against one another. Rapid quenching is achieved by avoiding convection cooling with a cooling liquid or gas and transferring heat out of the polymer by thermal conductivity. To achieve high thermal conductivity the molten polymer is put in intimate contact with a cold, dry, metallic surface. The presence of cooling liquid on the surface in contact with the molten polymer is deliberately avoided so as to obtain good thermal contact between molten polymer and metallic surface. The inventive process is particularly adaptable to the mass production of polymer film with a minimum amount of equipment.

BRIEF DESCRIPTION OF THE DRAWING

FIG. 3 is a side view similar to that in FIG. 1 showing the apparatus in operation.

DETAILED DESCRIPTION

(1) The process

Figure 1:
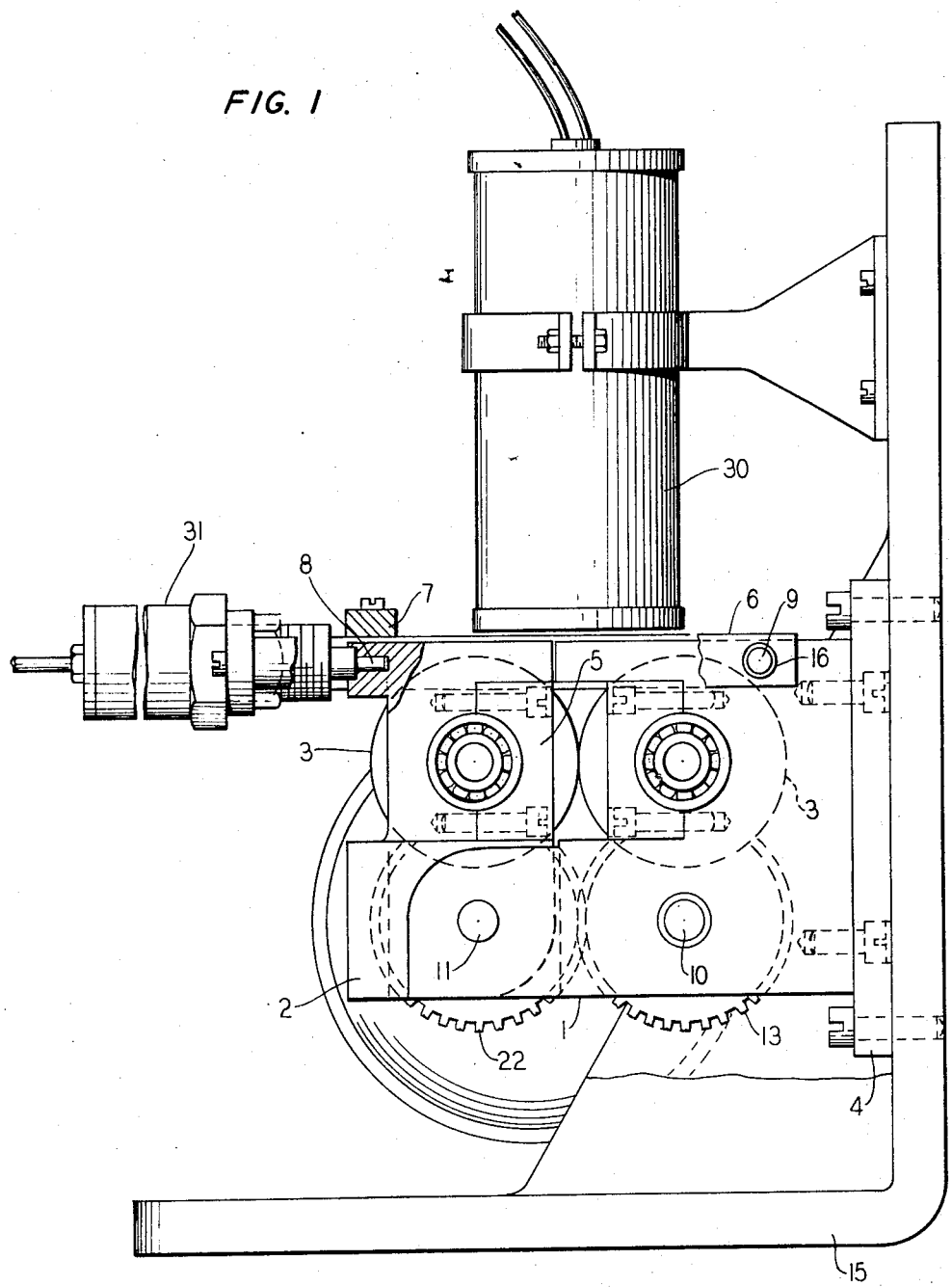
FIG. 1 is a side view of one form of apparatus suitable for treating a polymer by the inventive process showing a furnace for melting the polymer, the rollers on which the molten polymer is cooled, an air piston for pushing the rollers together, and gears for driving the rollers.

The invention is a process for treating crystalline polymer films to improve their mechanical properties. Typical crystalline polymers are between 10 and 90 percent crystalline depending on processing conditions. Also, these polymers may contain as much as 10 percent additives in the form of cross-linking agents, oxidation inhibitors, and the like. The inventive process also may increase the transparency of the film and in some cases represents the only means now known to obtain highly transparent polymer films.

The inventive process involves simultaneous application of high shearing rates and high quenching rates. It is of importance that the shearing process operate on the polymer in its molten form so as to achieve the high rate of shear. Also of importance is that the quenching be sufficiently rapid so that the polymer film become solidified while the shearing forces are still being applied. Simultaneous rapid shearing and quenching are achieved by contacting the molten polymer with a high thermal conductivity surface so as to press on the molten polymer at the same time as conducting heat out of the molten polymer.

A convenient means of achieving simultaneous rapid shearing and quenching is to allow molten polymer to come in contact with two dry metal rollers which are being forced against one another. The rollers are rotated in opposite directions in such a way as to draw the molten polymer between the rollers. Typically, an air piston can be used to force one roller against the other. The force used in this arrangement, and therefore the rate of shear, can be changed by adjusting the air pressure.

In order to achieve rapid quenching, convection cooling with a cooling liquid or a gas is avoided, and the high rate of heat transfer necessary for rapid quenching is obtained by conducting heat out of the polymer. For this reason the molten polymer is put in contact with a cold dry surface, such as a metallic surface, which has high thermal conductivity. The presence of cooling liquid on the surface in contact with the molten polymer is deliberately avoided so as to obtain good thermal contact between molten polymer and metallic surface. Care is also taken to keep the metallic surfaces clean and well-polished so as to have good thermal contact with the metallic surface. Cooling may be provided by circulating cooling liquid onto those metal surfaces not in contact with the molten polymer. The temperature of the rollers should be kept below the melting temperature of the polymer being processed.

(2) Examples (a) *High-density polyethylene.*—As a typical example of a crystalline polymer, films of high density (0.96 g./cm.$^3$) polyethylene were made by this process. The polymer was heated to a melt temperature of 190° C. An air piston was used to force the two rollers together with a force of about 250 pounds. The area over which this force was applied to the polymer was approximately one-eighth inch square so that the pressure applied to the molten polymer was 2000 pounds per square inch. The roller speed was 550 r.p.m. and the roller diameter 2 inches. The molten polymer bead was in the form of a disk, ¼ inch in diameter and 1/16 inch in thickness. The resulting sample had a slender oblong shape of typical dimensions of 0.002 inch thick, 2 inches long and ¾ inch wide. This film is between 40 and 80 percent crystalline as measured by differential thermal analysis. The characteristics of this film are described below.

The success of the process was found to depend strongly on the dwell time of the polyethylene melt at the roller gap. For example, if at a fixed melt temperature the roller speed was set too high, the film started to curl and wrinkle after coming out from between the rollers. The polyethylene melt evidently did not have sufficient time to completely solidify while passing through the rollers. If the roller speed was too slow the rollers would stop in the middle of the process because the polyethylene melt solidifies before passing through the rollers. Proper dwell time between the rollers depends on, among other factors, the amount of polyethylene melt, the melt temperature, the roller material and the roller size.

Typical conditions can be given for a melt temperature of 190° C. under these conditions the roller speed should not be less than about 300 r.p.m. or greater than about 650 r.p.m. The optimum speed is 500 r.p.m. These conditions pertain to a roller diameter of two inches. Under these optimum conditions the dwell time of the polyethylene melt in the roller gap is 0.005 second. In this estimate, it was assumed that ¼ inch of the roller circumference is in contact with the polymer. In passing through the roller, the molten polymer is solified. Polyethylene solidifies at a temperature of about 140° C. Thus, the temperature of the polymer is reduced at least 50° C. in the dwell time that the polymer is in contact with the roller. Under these conditions, the quenching rate is 10,000° C./second. Obviously, if the temperature of the polymer after leaving the roller is reduced more than 50 degrees, then the quenching rate is greater than 10,000° C./second.

The shearing rates can be estimated in the following way. The melt entering the rollers has a thickness of approximately 1/16 of an inch. It emerges from the rollers with a thickness of approximately three mils. Part of the reduction in thickness is accounted for by elongation in the lateral direction. However, most of the reduction in thickness is accounted for by elongation in the rolling direction. The elongation ratio in the rolling direction is approximately 8 to 1 and in the lateral direction approximately 3 to 1. This yields shearing rates of $2.4 \times 10^5$/second and $0.7 \times 10^5$/second for the rolling and lateral directions, respectively. Thus, the resultant shearing rate in the direction intermediate between the rolling and lateral directions is roughly $2.5 \times 10^5$/second.

As stated above, these optimum conditions depend, amongst other things, on the melt temperature of the polymer. For example, increasing the melt temperature requires a longer dwell time and therefore reduced roller speed. Dwell times as long as 0.05 second or longer might be optimum where the molten polymer is heated above 190° C. Also, the forces pushing the two rollers together should be at least 300 pounds per square inch to achieve intimate contact between polymer and roller but may be further adjusted to obtain either a desired film thickness or increased shearing for improved mechanical properties.

Of particular importance in the inventive process is the effect of simultaneous rapid shear and quenching on the mechanical properties of the polymer film. For this reason a comparison was made of the mechanical properties of high density polyethylene films made by the inventive process and the extrusion process. For example, the Young's modulus exhibited by the film is of particular significance in many applications. For films made by the extrusion process (with the hot roller or blown extrusion process) the Young's modulus exhibited by the film is $8 \times 10^4$ p.s.i. Films made by the inventive process exhibit a Young's modulus of $58 \times 10^4$ p.s.i. in the rolling direction and $14 \times 10^4$ p.s.i. in the lateral direction. The breaking stress for extruded film is $4 \times 10^3$ p.s.i. whereas for the inventive process $15 \times 10^3$ p.s.i. in the rolling direction. Breaking strain remains approximately the same at 50 percent. It is also observed that the inventive rolling process makes the mechanical properties of the film in the rolling direction different from that in the lateral direction.

Another characteristic of the high density polyethylene films made by the inventive process is that they are highly transparent. This could be particularly advantageous in certain applications as, for example, in insulating material in display devices where transparency might be of importance. This is of particular significance in connection with high density polyethylene films because of the known difficulty in making these films transparent.

(b) *Low density polyethylene.*—Low density polyethylene film was also made by the inventive process in much the same manner as described above. For low density film the molten polymer was introduced to the surface of the roller at a temperature of 180° C. A roller speed of 300 r.p.m. was used in the experiments. This yielded a transparent film free from wrinkles which would be present if the film emerged from the rollers in a partially molten state.

The mechanical properties of low density polyethylene film made by the inventive process are also superior in many respects to that made by the extrusion processes. For example, the extrusion processes yield films with a Young's modulus of $2-3 \times 10^4$ p.s.i. depending on whether the hot roller or blown method is used. However, the inventive process yields films with a Young's modulus of $4.2 \times 10^4$ p.s.i. in the rolling direction. The breaking stress of the inventive film is superior to that found from the extrusion process made with the hot-roller method and about the same as that obtained by the blown method.

(c) *Polypropylene.*—Experiments were also carried out using polypropylene. In this case the molten polymer was introduced onto the surface of the roller at a temperature of 190° C. Roller speed was 300 r.p.m. Under these conditions a clear, transparent film was produced free from wrinkles. The mechanical properties of this film are also superior to that of film made by the extrusion process. For example, the Young's modulus exhibited by film made by the extrusion process varies from 1.3 to $1.7 \times 10^5$ p.s.i. depending on whether the film is made by the hot-roller extrusion process or the blown extrusion process. Film made by the inventive process exhibit a Young's modulus of $2.5 \times 10^5$ p.s.i. in the rolling direction and $2.8 \times 10^5$ p.s.i. in the transverse direction. Breaking stress is also somewhat improved at least in the rolling direction. For example, for the hot roller extrusion process, the breaking stress is $3.5 \times 10^3$ p.s.i. and for the blown extrusion process it is $5 \times 10^3$ p.s.i. For the inventive film the breaking stress is $7.8 \times 10^3$ p.s.i. in the rolling direction and $2.9 \times 10^3$ p.s.i. in the transverse direction.

(d) *Polybutene-1.*—Experiments were also carried out on polybutene-1. The molten polymer was introduced onto the roller at a temperature of 150° C. and the roller speed was 200 r.p.m. Again the Young's modulus of the inventive film is increased over that exhibited by film made by the extrusion process. The extruded film yields Young's modulus of $3.7 \times 10^4$ p.s.i. For the inventive film the measurement yielded $15 \times 10^4$ p.s.i. Breaking stress was also increased from $1.6 \times 10^3$ p.s.i. to $8.2 \times 10^3$ p.s.i.

(3) The drawing

FIG. 1 is a side view of an apparatus which was used to process film by the inventive process. The apparatus comprises a heater 30 used to melt the polymer, a pair of rollers 3 used to quench and shear the molten polymer, a pair of gears 13 and 22 used to drive the rollers, an air piston 8 used to force the two rollers together. This assembly is mounted on a base 15 which also has attached to it a motor (not shown) which supplies mechanical power to gear shaft 10 through other gears (20 and 13) shown in FIG. 2.

Figure 2:
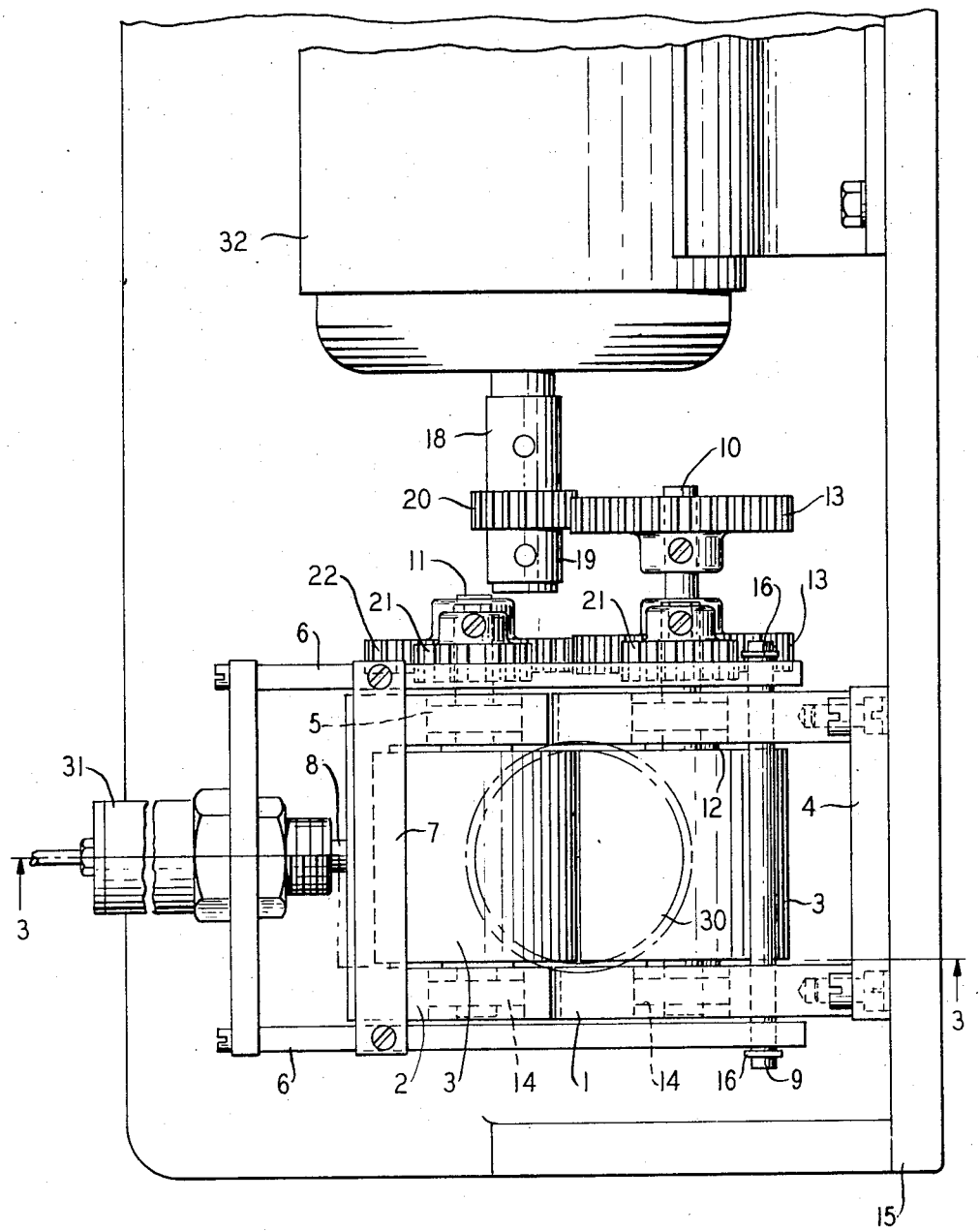
FIG. 2 is a top view of the same apparatus showing the air piston forcing the two cylinders together and the motor for driving the rollers.

FIG. 2 is a top view of the apparatus showing the motor 32 and the motor shaft 18 and gear assembly 20 and 13. Mechanical power is transferred from the motor shaft onto the gear 13 and onto the shaft 10. The two cylinders 3 and air piston 8 are also shown.

FIG. 3 is a side view similar to FIG. 1 showing the apparatus in operation. The molten polymer from the heater 30 is allowed to come into contact with the two rotating cylinders 3 where it is rapidly quenched into solidified polymer film. The shearing rate to which the molten polymer is exposed can be adjusted by increasing or decreasing the roller speed and the air pressure on the air piston.

What is claimed is:

1. A process for producing polymer films having at least 10% crystalline form by applying high shearing and quenching rates to the polymer characterized in that the molten polymer is put in intimate contact with a pair of compressing metal surfaces with a minimum force of 300 pounds per square inch, said surfaces being maintained at a temperature at which the polymer is rigid where at least one surface is moving so as to discharge polymer in rigid form with an average contact time of less than 0.1 second and where the molten polymer is exposed to simultaneous shearing and quenching of at least $0.7 \times 10^5$ per second and 10,000° C. per second, respectively.

2. The process of claim 1 in which the average contact time is less than approximately 0.01 second.

3. The process of claim 2 in which the high shearing and quenching rate is achieved by allowing molten polymer to go between two metal rollers which are being forced against one another.

4. Process of claim 1 in which the polymer is an olefin polymer, the temperature of the molten polymer is at least 130° C. when it comes in contact with the metal surfaces and the temperature of the rigid polymer leaving the metal surfaces is less than the melting temperature of the polymer.

References Cited

UNITED STATES PATENTS

| | | | |
|---|---|---|---|
| 2,075,735 | 3/1937 | Loomis | 264—175 |
| 3,165,505 | 1/1965 | Gaeth | 264—175 |
| 3,175,026 | 3/1965 | James | 264—212 |
| 3,085,292 | 4/1963 | Kindseth | 264—216 |
| 3,285,442 | 11/1966 | Tigner | 264—70 |

FOREIGN PATENTS

| | | | |
|---|---|---|---|
| 893,130 | 4/1962 | Great Britain | 264—175 |
| 964,321 | 7/1964 | Great Britain | 264—175 |

ROBERT F. WHITE, Primary Examiner

J. R. THURLOW, Assistant Examiner

U.S. Cl. X.R.

260—94.9 A; 264—68, 216, 237, 348, 349